July 8, 1924.
J. J. MICHALSKI
THEFT DETECTOR FOR AUTOMOBILES
Filed June 29, 1923   2 Sheets-Sheet 1
1,500,635
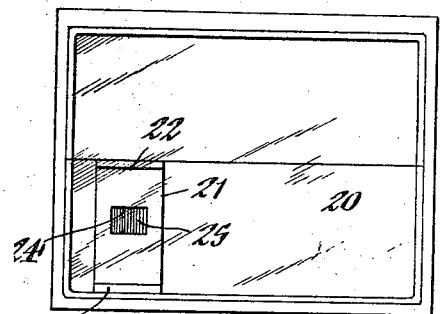
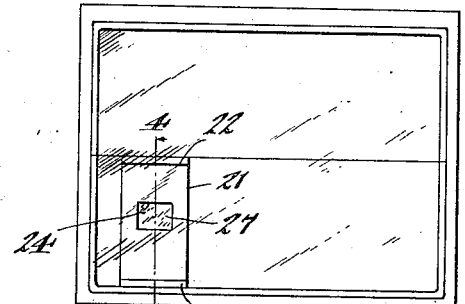
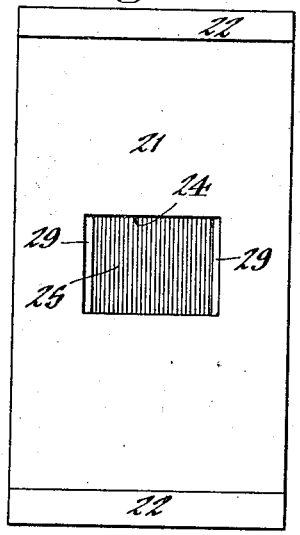
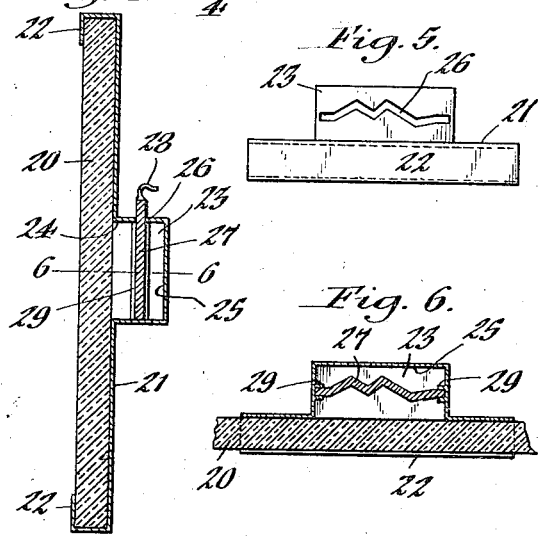
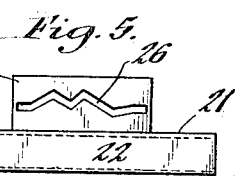
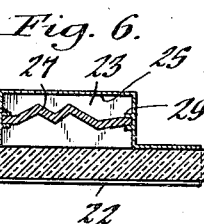
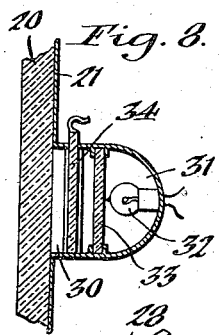
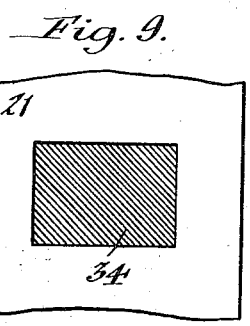
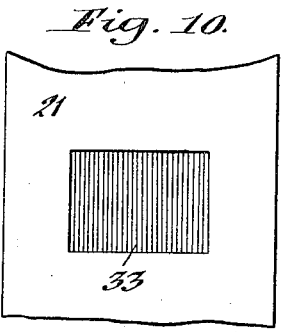
Inventor,
Joseph J. Michalski
by Geyer & Geyer
Attorneys.

July 8, 1924.  
J. J. MICHALSKI  
THEFT DETECTOR FOR AUTOMOBILES  
Filed June 29, 1923  
1,500,635  
2 Sheets-Sheet 2

Inventor,
Joseph J. Michalski
by Geyer & Geyer
Attorneys.

Patented July 8, 1924.

1,500,635

UNITED STATES PATENT OFFICE.

JOSEPH J. MICHALSKI, OF BUFFALO, NEW YORK.

THEFT DETECTOR FOR AUTOMOBILES.

Application filed June 29, 1923. Serial No. 648,481.

*To all whom it may concern:*

Be it known that I, JOSEPH J. MICHALSKI, a citizen of the United States, residing at Buffalo, in the county of Erie and State of New York, have invented new and useful Improvements in Theft Detectors for Automobiles, of which the following is a specification.

This invention relates to a detector or identifying device for protecting automobiles and similar vehicles from theft.

Its chief object is to provide an improved device of this character which is particularly adapted for attachment to the windshield or other transparent part of the vehicle where it is conspicuous and readily seen.

Other objects of the invention are to provide a visible detector which is simple and compact in construction, which can be easily manipulated, and which is durable and not liable to get out of order.

Figure 11:
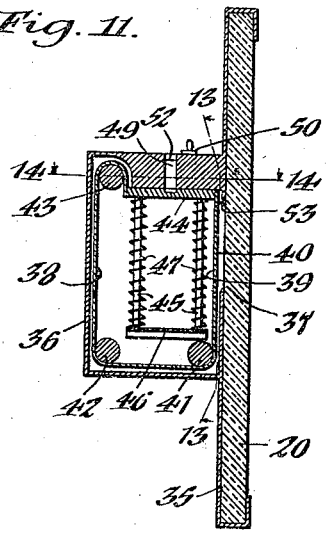
Figure 12:
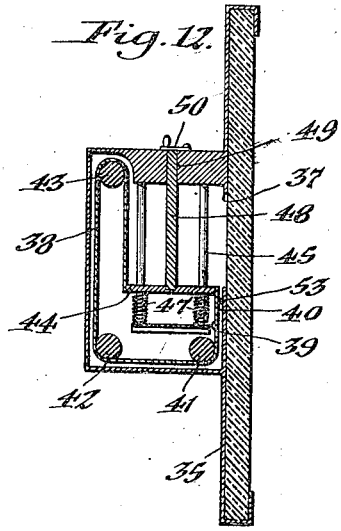
Figure 13:
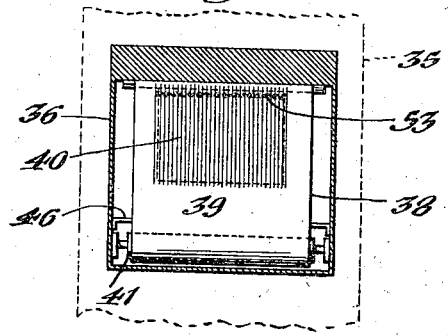
Figure 14:
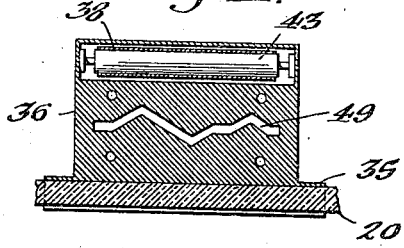
Figure 15:
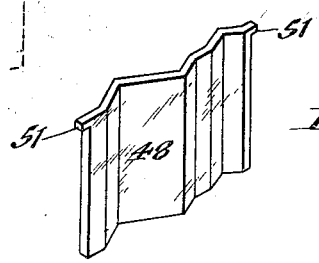

In the accompanying drawings:

Figure 1 is a front view of a vehicle-windshield with the improved detector mounted thereon, the same being in its absence-indicating position. Figure 2 is a similar view, showing the detector in its presence-indicating position. Figure 3 is an enlarged front view of the detector. Figure 4 is an enlarged vertical section on line 4—4, Fig. 2. Figure 5 is a top plan view thereof. Figure 6 is a horizontal section on line 6—6, Fig. 4. Figure 7 is a perspective view of the presence-indicating member or detector key. Figure 8 is a fragmentary vertical section of a modified form of the improvement, showing the presence-indicating member in position. Figure 9 is a fragmentary front view thereof with the parts in the position shown in Fig. 8. Figure 10 is a similar view, showing the appearance of the detector with the absence-indicating member in position. Figure 11 is a vertical section of another modified form of the improvement, showing the presence-indicating member removed. Figure 12 is a similar view, showing said member in position. Figure 13 is a vertical section on line 13—13, Fig. 11. Figure 14 is a horizontal section on line 14—14, Fig. 11. Figure 15 is a perspective view of a modified form of presence-indicating member or key.

Similar characters of reference indicate corresponding parts throughout the several views.

In the embodiment of the invention shown in Figs. 1–7, inclusive, the improved theft detector is shown applied to the lower section 20 of a vehicle windshield, although it is to be understood that it is equally applicable to any other transparent part of the vehicle. The detector consists of a supporting member 21, preferably in the form of a sheet-metal panel, which may be secured to the windshield section by anchoring or embedding it therein or by bending the upper and lower ends thereof around the latter, as shown at 22. Formed on the rear side of this supporting member is a forwardly-facing pocket or compartment 23 of substantially rectangular form, and opposite the latter said member is provided with a sight aperture 24 of a corresponding shape. The front face of this pocket is provided with a colored coating or surface 25, such, for example, as red which constitutes the absence-indicator of the device and which is clearly visible through the windshield, the latter forming a closure for the pocket.

The pocket is provided in one of its sides, preferably its top, with an opening or key-slot 26 of irregular shape. Adapted for insertion and removal to and from this pocket through the slot is a presence-indicating member or detector-key 27 made of any suitable material, which, by preference, has a highly finished reflecting surface of any appropriate color, for example, white, which contrasts with the red indicator 25. When placed in the pocket, the presence-indicator 27 is visible through the windshield and sight aperture 24. In this position, said presence indicator completely conceals the absence-indicator from view. Upon the removal of the former, the latter is uncovered to indicate to police officers and others that the car is being driven by some unauthorized person. To facilitate the insertion and removal of the presence-indicator key, it has a finger piece 28. For the purpose of guiding said key into and out of its pocket, the side walls of the latter may be provided with channels or ways 29.

The presence-indicator keys of different automobiles are made to vary so that each of such keys fits only the corresponding opening in the pocket 23.

In the use of this device, when the owner or other authorized person occupies or drives the automobile, he sees that the detector-key 27 is located in its pocket, as shown in Figs. 2, 4 and 6. When the car is left standing or parked, the owner removes the detector-key, keeping it in his possession, leaving the absence-indicator 25 exposed to view.

The embodiment of the invention shown in Figs. 8, 9 and 10 is particularly adapted for night use. Its pocket 30 is provided with a lamp-body extension 31 containing an electric lamp 32. In this case the absence-indicating member is in the form of a red lens 33 arranged forwardly of the lamp and the presence-indicator or key is in the form of a blue lens 34, removable from the pocket and located in front of said red lens. By this arrangement, when the lamp is lighted and the blue detector lens 34 is in position, a green light is visible through the windshield, indicating the owner's presence in the car. Upon the removal of this blue lens, the red lens 33 is visible, indicating the owner's absence from the vehicle.

The modified form of the invention shown in Figs. 11–15, inclusive, comprises a supporting member 35 having a casing or compartment 36 and a sight aperture 37. Contained within this compartment is a flexible carrier 38 in the form of an endless apron, the upright front stretch 39 thereof bearing an absence-indication 40, preferably consisting of a red area or coating visible through the windshield and sight opening in its operative position. This carrier is adapted for movement relative to the sight opening to bring its absence-indication into and out of register therewith. For this purpose, it may pass at its lower end around front and rear rollers 41, 42, while its upper end passes around a single rear roller 43. The opposing laterally-spaced ends of the carrier are connected by a transverse tie plate or contact pin 44 which is guided for vertical movement on upright rods 45 fastened at their lower ends in a cross piece 46 and at their upper ends in the top of the compartment 36. Coil springs 47 applied to these rods tend to hold the tie plate in its elevated position against the underside of the compartment top wall and the absence-indicating area 40 of the carrier in its operative position in line with the sight aperture 37. Controlling the movement of this flexible carrier is an actuating member which is in the form of a presence-indicator or detector-key 48 contrasting in color with the absence-indicating portion 40 of said carrier. This detector key is adapted to enter a key-slot 49 in the top wall of the compartment and contact with the upper side of the tie plate 44, so that when said key is inserted and forced downwardly into said compartment, the carrier is moved therewith to withdraw its absence-indicating portion out of register with the sight aperture while the key is brought into register therewith. The latter may be held in its operative position by a suitable latch 50 applied to the top wall of the compartment and movable across the key-slot 49. To limit its downward movement, said detector-key may be provided at its opposite sides with stop shoulders 51 adapted to engage corresponding recesses 52 at the ends of the key-slot.

In order to keep that side of the windshield facing the compartment clean, the flexible carrier 38 may be provided with a brush 53 arranged to wipe the windshield as the carrier is moved back and forth into and out of its indicating position.

I claim as my invention:

1. A theft detector for a vehicle-windshield or the like, comprising a supporting member adapted for direct attachment to one side of the windshield and having a pocket therein including a sight opening facing said windshield, the latter forming a transparent closure for the pocket, and a pair of contrasting complementary detecting members applied to said supporting member and visible through the windshield, one of said detecting members being contained permanently within said pocket and the other member being detachable therefrom and arranged to render the first-named detecting member inoperative when said detachable member is in its operative position.

2. A theft detector for a vehicle-windshield or the like, comprising a supporting member adapted for direct attachment to one side of the windshield to lie flatwise against the same and having a pocket therein opening toward the latter, said windshield forming a transparent closure for the pocket, the latter having a key-slot in one of its walls, and a pair of contrasting complementary detecting members applied to said supporting member and visible through the windshield, one of said detecting members being contained within said pocket while the other member is constructed in the form of a key and movable into and out of said pocket through its key-slot, said last-named detecting member being arranged to render the first-named detecting member inoperative when the former is in its operative position.

3. A theft detector for a vehicle-windshield or the like, comprising a supporting panel adapted for attachment to a windshield to lie flatwise against the same and having an integrally-formed pocket therein, opening toward the latter, said windshield forming a transparent closure for said pocket, the latter having a slot in one of its walls disposed at substantially right angles to said pocket-opening, and a pair of contrasting complementary detecting members applied to the pocket, one of said members being movable into and out of said pocket through its slot.

4. A theft detector of the character described, comprising a supporting member having a sight aperture, a flexible carrier bearing indicating means movable relatively to said aperture, means for guiding said carrier, and an actuating member for said carrier, said actuating member bearing indicating means contrasting with that of the carrier and adapted to register with said sight aperture.

5. A theft detector of the character described, comprising a supporting member having a sight aperture, a flexible carrier bearing indicating means movable relatively to said aperture, means for guiding said carrier, a contact element connected to the carrier, and an actuating member for said carrier arranged to engage said contact element, said actuating member bearing indicating means contrasting with that of the carrier and adapted to register with said sight aperture.

6. A theft detector of the character described, comprising a supporting member having a sight aperture, a flexible carrier bearing indicating means movable relatively to said aperture, yielding means for retaining said carrier in its operative indicating position, and an actuating member for said carrier bearing indicating means contrasting with that of the latter, said carrier and said actuating member being movable in unison, the one into the other out of operative position relatively to the sight aperture.

7. A theft detector of the character described, comprising a supporting member having a compartment and a sight aperture opposite the latter, a flexible carrier bearing indicating means, contained in said compartment and movable into and out of register with said aperture, a contact plate suspended transversely between the opposing ends of said carrier, guiding means for the latter and said plate, means for retaining said contact plate in its elevated position and the indicating means of the carrier in its operative position, and an actuating member for said carrier movable into and out of register with the sight aperture, said member bearing indicating means contrasting with that of the carrier.

8. A theft detector of the character described, comprising a supporting member having a compartment and a sight aperture opposite the latter, a flexible carrier bearing indicating means contained in said compartment and movable into and out of register with said aperture, a contact plate suspended transversely between the opposing ends of said carrier, guide rollers for the latter, means tending to retain said carrier in its normally operative position, an actuating member for said carrier removably arranged in said compartment and adapted to register with the sight aperture, said member bearing indicating means contrasting with that of the carrier, and means for holding said actuating member in its operating position, the latter and said carrier being movable in unison, the one into and the other out of operative position relative to the sight aperture.

9. A theft detector for a vehicle-windshield or the like, comprising a supporting member having a sight aperture and adapted for attachment to one side of the windshield, contrasting detecting members applied to said supporting member, at least one of the detecting members being movable relatively to the other into and out of register with the sight aperture, and a cleaning device applied to said movable member and arranged to engage that portion of the windshield opposite said sight aperture.

10. A theft detector for a vehicle windshield or the like, comprising a pair of contrasting complementary detecting members applied to the windshield and visible through the same, one of said members being detachably mounted on the latter and arranged to render the other detecting member inoperative when the former is in its operative position.

JOSEPH J. MICHALSKI.